(12) United States Patent
DaSilva et al.

(10) Patent No.: US 6,566,839 B2
(45) Date of Patent: May 20, 2003

(54) SWITCHED CAPACITOR MOTOR DRIVER

(75) Inventors: Daniel Robert DaSilva, Clovis, CA (US); John Pretzer, Fresno, CA (US); Glenn Waehner, Fresno, CA (US)

(73) Assignee: Pelco, Clovis, CA (US)

( * ) Notice: Subject to any disclaimer, the term of this patent is extended or adjusted under 35 U.S.C. 154(b) by 0 days.

(21) Appl. No.: 09/895,505

(22) Filed: Jun. 28, 2001

(65) Prior Publication Data

US 2003/0001532 A1 Jan. 2, 2003

(51) Int. Cl.[7] .................................................. H02P 3/18
(52) U.S. Cl. ...................... 318/703; 318/254; 310/68 R
(58) Field of Search ................................ 318/254, 701, 318/703, 739, 768, 794, 795; 310/68 R, 68 B

(56) References Cited

U.S. PATENT DOCUMENTS

| 3,036,255 A | * | 5/1962 | Lewus | 318/739 |
|---|---|---|---|---|
| 4,486,697 A | * | 12/1984 | Diefenbatch et al. | 318/703 |
| 4,794,288 A | * | 12/1988 | Lewus | 318/739 |
| 5,821,723 A | * | 10/1998 | Kim | 318/701 |

OTHER PUBLICATIONS

A DMOS 3A, 55V, H–Bridge: The LDM 18200, National Semiconductor, App. Note 694, Dec. 1999.

* cited by examiner

Primary Examiner—Khanh Dang
(74) Attorney, Agent, or Firm—Mark D. Miller

(57) ABSTRACT

The present invention is a method and apparatus that allows the torque of an electric motor to be increased allowing the motor to be operated at higher speeds and at higher torque without raising the supply voltage, thus allowing for a wider dynamic range of speed and torque to be realized. This is accomplished by connecting one or more capacitors in series with each motor winding, and selectively activating the capacitors at higher speeds where the frequency of the motor resonates with that of the capacitor(s). Switching a capacitor into the circuit with the motor in a particular frequency range allows higher currents to flow through the motor windings resulting in higher torque.

9 Claims, 6 Drawing Sheets

SIMPLIFIED DIAGRAM OF THE CONTROL AND DRIVE CIRCUIT FOR A 2-PHASE MOTOR APPLICATION

SWITCHED CAPACITOR MOTOR DRIVER

BACKGROUND OF THE INVENTION

1. Field of the Invention

The present invention relates generally to the operation of variable speed electric motors, and more particularly to a switched capacitor resonance circuit for increasing the available speed of a variable speed electric motor without increasing the voltage supplied to the motor, or the current supplied to the motor circuit.

2. Description of the Prior Art

Variable speed electric motors, particularly stepper motors, are employed in a wide variety of applications where precise movements are desired. A typical application of a variable speed motor is in a closed circuit television (CCTV) system where a camera unit is mounted on a movable base. Movement is imparted to the base using one or more variable speed motors which cause the camera to scan, pan and/or tilt.

Because electric motors are inherently inductive, at high speeds the supply of voltage must be great enough to drive the AC current through the motor windings. A typical stepper (or DC brushless) motor will have a given inductance based on the number of motor windings, with more windings providing additional inductance. Additional windings are preferred because they allow for more strength, or torque, in the motor. Thus, a typical strong electric motor will have a higher inductance than a weaker electric motor for equal amounts of current.

As an electric motor is operated, its speed (RPM or frequency) may be increased according to the needs of the application. The usable speed of an electric motor is determined by available torque which is directly proportional to current driven through the motor. The current in the motor is limited by resistance of the windings, the inductance of the windings, and the back EMF of the motor. As the frequency of the motor increases, so also does the reactance in the motor circuit, the reactance being a function of the inductance (i.e. number of windings) of the motor itself. At a given high frequency, the continually increasing reactance begins to affect the ability of current to flow through the motor circuit. As the frequency increases beyond this point, the supply voltage is unable to support the necessary current, or torque, desired in the circuit such that the motor speed begins to drop off. Eventually, a point is reached where the circuit is unable to accelerate the motor further. At such a high speed sufficient current cannot be forced into the motor and torque will fall to unusable levels.

One solution to this problem is to increase the supply of voltage provided to the circuit; however, in many systems this is not feasible or increased voltage is simply not available. Another solution is to change to a less inductive, higher current motor (i.e. a motor with fewer windings). A less inductive motor will have lower back EMF and lower inductance; however, it will not be as strong, and will require a higher drive current to reach the same torque values as a more inductive motor. Unfortunately, the necessary higher current for such a motor may not be feasible or available to the motor circuit.

It is therefore desirable to provide a way to increase the torque in a high inductance electric motor where limited voltage or current is available to the motor circuit (i.e. increasing motor torque without increasing the voltage supplied to the motor circuit, and without using a weaker motor which would increase the overall current required by the motor circuit).

SUMMARY OF THE INVENTION

The present invention provides a circuit that is useful for increasing the torque of electric stepper (and brushless DC) motors, allowing such motors to be operated at higher speeds and at higher torque without raising the supply voltage. The present invention also allows for a wider dynamic range of speed and torque to be realized. This is accomplished by connecting one or more capacitors in series with each motor winding, and selectively activating the capacitors at higher speeds where the frequency of the motor resonates with the capacitor(s). This allows higher currents to flow through the windings resulting in higher torque. Since the motor winding inductance is known, the capacitor value (or values) can be calculated at the resonant frequency (or frequencies—speeds) at which the motor will be running.

The driving circuitry must have the capability of switching the capacitor(s) in and out of the motor circuit. This is required because at zero speed when the motor is stopped, a DC current must be present in the winding to hold torque. For this condition, the capacitor cannot be connected to the motor winding (cannot be in series). The same holds true for lower speeds, since the capacitor(s) will have a very high reactance at low speeds and will actually hinder acceleration of the motor, resulting in very low winding current and torque. Because of these conditions, the resonant frequency of the motor/capacitor(s) and the point(s) where the capacitor(s) is/are switched into the circuit must be chosen carefully.

The following illustrative discussion is based on switching a single capacitor into the motor circuit; however, the present invention includes the potential use of multiple capacitors, used one after another and at different frequencies, to further extend the motor torque.

At the start of operation the capacitor switching device is closed such that the capacitor is out of the circuit, and the speed is zero. The switching device may be a mechanical relay, optical relay, or other solid state switch. If the switch is open at startup, the motor will not start because the capacitor will not pass DC current required at startup. The motor speed (frequency) then increases as the motor accelerates. Eventually, the motor will accelerate to a frequency A (the drop-off frequency) where the reactance from the motor itself begins to prevent the necessary current from reaching the motor. Current delivered to the motor drops off as it is accelerated beyond drop-off frequency A until it reaches frequency C where no further acceleration occurs (drop-out frequency).

A capacitor value is chosen which resonates with frequency B (the resonant frequency). Resonant frequency B is deliberately selected to be higher than drop-off frequency A, but lower than cut-off frequency C. There is a range of frequencies on either side of resonant frequency B (both above and below frequency B) which approach the resonance of frequency B. Selection of resonant frequency B establishes a point somewhere between drop-off frequency A and resonant frequency B where the dropping frequency of the motor crosses into the range of frequencies approaching resonant frequency B. It is at this cross over point that the capacitor is switched on in the circuit. Because the capacitor resonates with the motor at resonant frequency B, it reinforces the rotation of the motor within a range of frequencies on either side of resonant frequency B without the need for additional voltage. This allows the motor to accelerate to and slightly beyond resonant frequency B, therefore increasing current and torque, without increasing the voltage.

The value for the capacitor is selected based on the available current and voltage, and the number of windings in the motor, and is established so that it has a resonant frequency B at a point that is above the drop-off frequency A of the motor, but not so high that it is beyond the cut-off frequency C, preferably closer to frequency C than to frequency A. When the lower end of the frequency range of resonant frequency B is reached, this is detected by microprocessor circuitry, and the capacitor is switched into the circuit. Additional capacitors may also be included in the circuit above resonant frequency B, establishing higher resonant frequencies D, E, and so on until the back EMF of the motor prevents additional acceleration. The next sequential capacitor is switched into the motor circuit at the same time that the previous capacitor is switched out of the circuit so that only one capacitor is activated at a time. As motor speed is reduced, the capacitors are switched back into the circuit in reverse order, and eventually removed from the circuit at very low speeds and at full stop.

It is therefore a primary object of the present invention to provide a switched capacitor resonance circuit for use in variable speed electric motors to allow increased motor speed without increasing voltage delivered to the circuit.

It is also a primary object of the present invention to provide a switched capacitor resonance circuit for use in variable speed electric motors to allow increased motor speed without reducing motor windings which would require increasing the current delivered to the circuit.

It is also a primary object of the present invention to provide a method and apparatus for increasing the speed of a stepper or DC brushless motor without increasing the voltage delivered to the circuit.

It is another object of the present invention to provide a method and apparatus for increasing the frequency of rotation of an electric motor without increasing voltage by using a circuit having one or more capacitors that can be alternatively switched into series with the motor wherein each of said capacitors resonates with a high frequency of the motor.

It is another object of the present invention to provide a method and apparatus for increasing the frequency of rotation of an electric motor without reducing motor windings which would require increased current by using a circuit having one or more capacitors that can be alternatively switched into series with the motor wherein each of said capacitors resonates with a high frequency of the motor.

It is another object of the present invention to provide a method and apparatus that can increase motor speed using an existing motor and power supply.

It is another object of the present invention to provide a method and apparatus that can maximize speed for a given motor and power supply It is another object of the present invention to provide a computer switched capacitor resonance circuit for increasing the usable speed of a stepper motor.

It is another object of the present invention to provide a way to keep up the current supplied to an electric motor at higher speeds.

Additional objects of the invention will be apparent from the detailed descriptions and the claims herein.

DETAILED DESCRIPTION OF THE PREFERRED EMBODIMENTS

Figure 1:
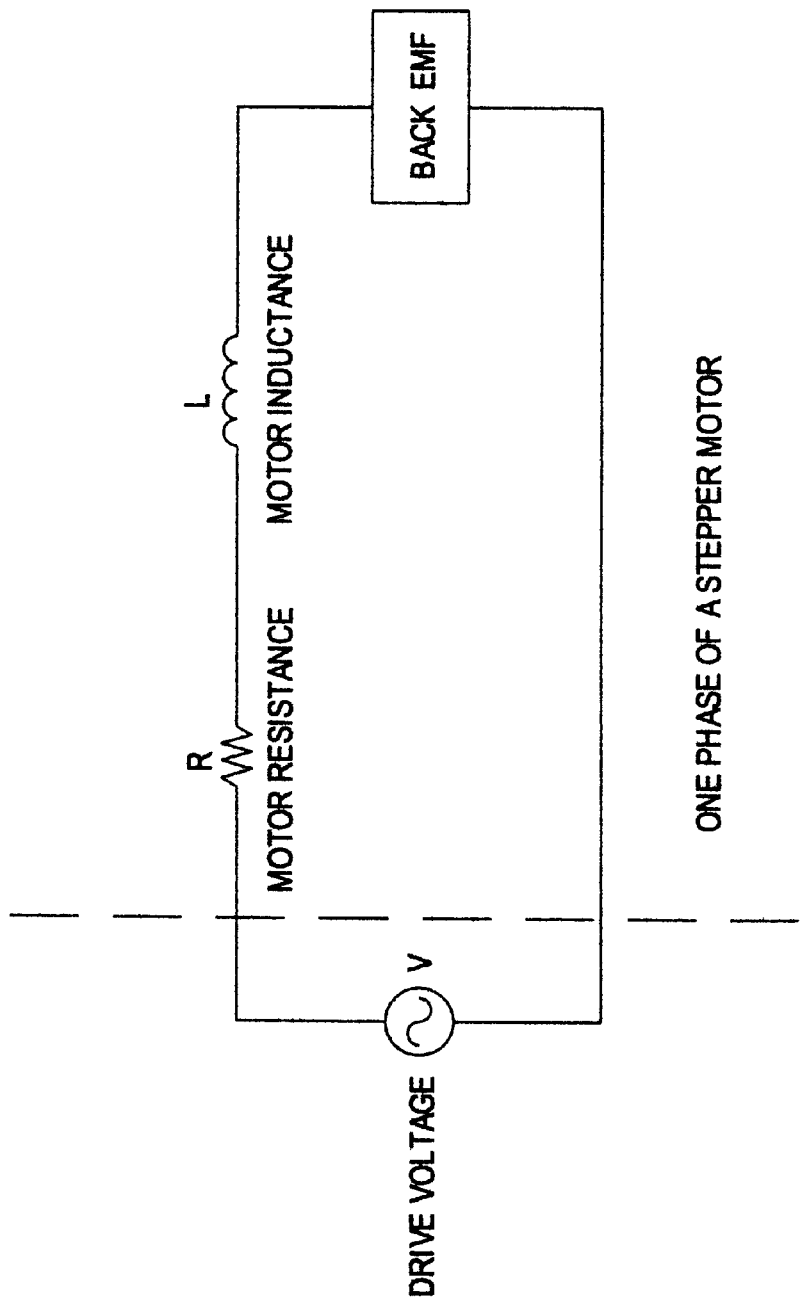
FIG. 1 is a schematic diagram of a typical prior art electrical motor circuit showing a circuit of one phase of a stepper motor.

Referring to the drawings wherein like reference characters designate like or corresponding parts throughout the several views, and referring particularly to the prior art motor circuit shown in FIG. 1, it is seen that the drive voltage encounters both resistance, reactance (related to inductance) and back EMF in passing through the motor. Back EMF (electromotive force or voltage) increases in proportion to speed as does the inductive reactance. The effect of back EMF is directly opposed to the drive voltage, therefore if the back EMF is 5 volts and the drive voltage is 10 volts the effective drive voltage is (10 volts–5 volts) 5 volts. It is this reduction in voltage that prevents higher current from reaching the motor, thereby limiting the available torque—unless voltage is increased.

The circuit of the present invention lowers the inductive reactance so at resonance the back EMF and Resistance are the only opposition to current. The full effect is only produced at the resonance frequency, although partial effects are appreciated on either side of the resonance frequency. The resonance frequency is computed by:

$$\text{Resonance Frequency}=1/(2\pi\sqrt{\text{motor inductance}*\text{switched capacitance}})$$

Where:

The Resonance Frequency is expressed in Hertz;

The Motor Inductance is expressed in Henrys;

The Switched Capacitance is expressed in Farads.

For example, in an application where the motor inductance is 20 millihenrys and the capacitance is 16 microfarads, the resonant frequency would be 281 hertz.

Figure 2:
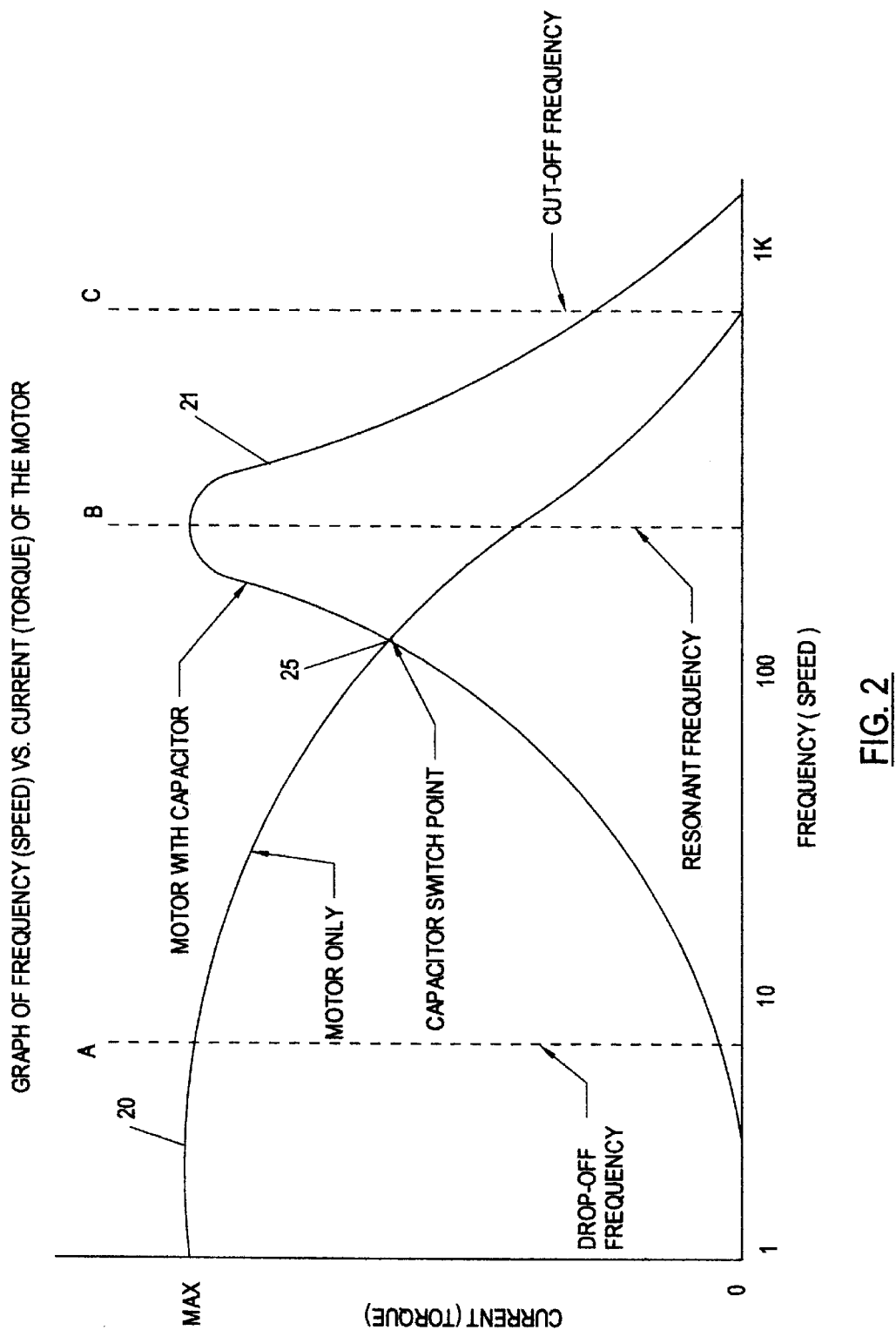
FIG. 2 is a graph showing the frequency (speed) of a motor relative to the current (torque) supplied to the motor, and a first capacitor resonance curve.

The graph of FIG. 2 illustrates current (or torque) vs. frequency (or speed) of the motor. Curve 20 depicts the motor only showing that the current drops off at higher frequencies as a result of the inductance of the motor. Frequency A is the beginning of the drop off, and frequency C is the maximum frequency of the motor alone. Curve 21 depicts a capacitor in the circuit. Curve 20 has no capacitor. As shown in curve 21, the "motor with capacitor" current peaks at the resonant frequency B.

The maximum motor speed is determined based on the current and voltage available to the circuit and the windings (inductance) of the motor. The capacitor value is selected using the above formula in order to establish a resonant frequency B that is chosen to allow for the greatest amount of current through the frequency (or speed) range. The capacitor is switched into the circuit during acceleration (and switched out during deceleration) at the point 25 where the "motor only" curve 20 and "motor with capacitor" curve 21 intersect.

Once the resonance frequency is established, it is programmed into a microprocessor. The processor controls the switching of the capacitor in series with the winding inductance at some frequency before resonance. At resonance point of the capacitor and motor inductance the reactance of the series combination is zero. At resonance, the current in the motor will be opposed by the back EMF of the motor and the resistance of the motor, but the inductive reactance of the motor will be cancelled by the capacitive reactance. This allows greater current to flow to the motor without increasing voltage.

When the processor determines switching speed has been reached the phase position is then compared to the desired phase switching point. This requires fast real time control by a computer in order to make switch time accurate. The phase at which the capacitor is switched is determined in order to cause the least amount of disturbance to motor movement. This is established through observation of the current waveform. Phase switching position is selected so that the current waveform is as undisturbed as possible by switching the capacitor.

The current waveforms for a two phase stepper motor are ideally a sine wave and a cosine wave. The capacitor is switched by the processor at the same phase position in each phase but since the two phases are 90 degrees apart the switching takes place 90 degrees apart. Hysteresis can be included in the switch speed such that on increasing speed the switch point is at higher speed than the when the speed is increasing. This is used to prevent oscillations at when operated at the switch speed.

Precise switching is possible with a processor and is important because a stepper motor is operated in a mode in which the motor is always required to be in sync with the drive waveform. The system is run without position feedback and therefore an important assumption is that there is no full step error between the commanded position and the actual position.

The motor may be synchronous and variable speed requiring an continuously variable frequency, constant current drive. This is implemented with a computer controlled H-Bridge by use of a current feedback chopper (a standard practice in the industry for driving a stepper motor), or by use of a computer controlled PWM waveform (which varies duty cycle as the speed varies to produce a constant current).

The capacitor is switched at a specific speed and phase of the current waveform. The computer which controls the stepper motor is use to switch at the specified speed and phase. Precise real time control is required to switch at phase and speed settings to prevent motor disruption which can cause missed steps (loss of sync) in a stepper motor. There may be hysteresis in the switching such that on increasing the switch point is higher at higher speed than the when the speed is decreasing.

Figure 3:
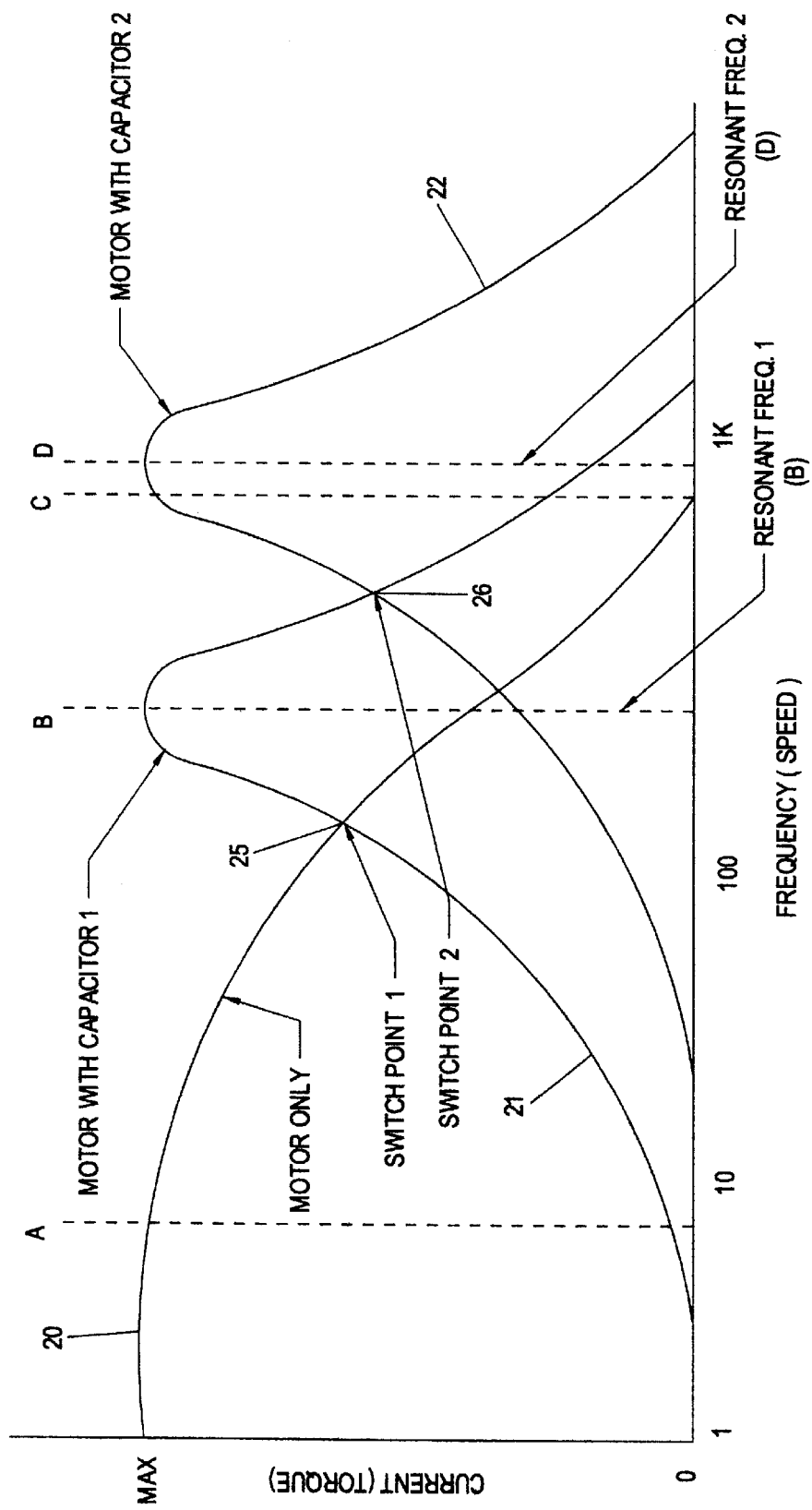
FIG. 3. is a graph showing the frequency (speed) of a motor relative to the current (torque) supplied to the motor, and first and second capacitor resonance curves.

The graph of FIG. 3 illustrates another current (or torque) vs. frequency (or speed) of the motor including an additional curve 22 representing a second capacitor in the circuit which peaks at second resonant frequency D. During acceleration, the first capacitor is switched into the circuit at crossover point 25. During continued acceleration, the first capacitor is dropped and the second capacitor is switched into the circuit at crossover point 26. During deceleration, the capacitors are switched into and out of the circuit in the opposite order.

Figure 4:
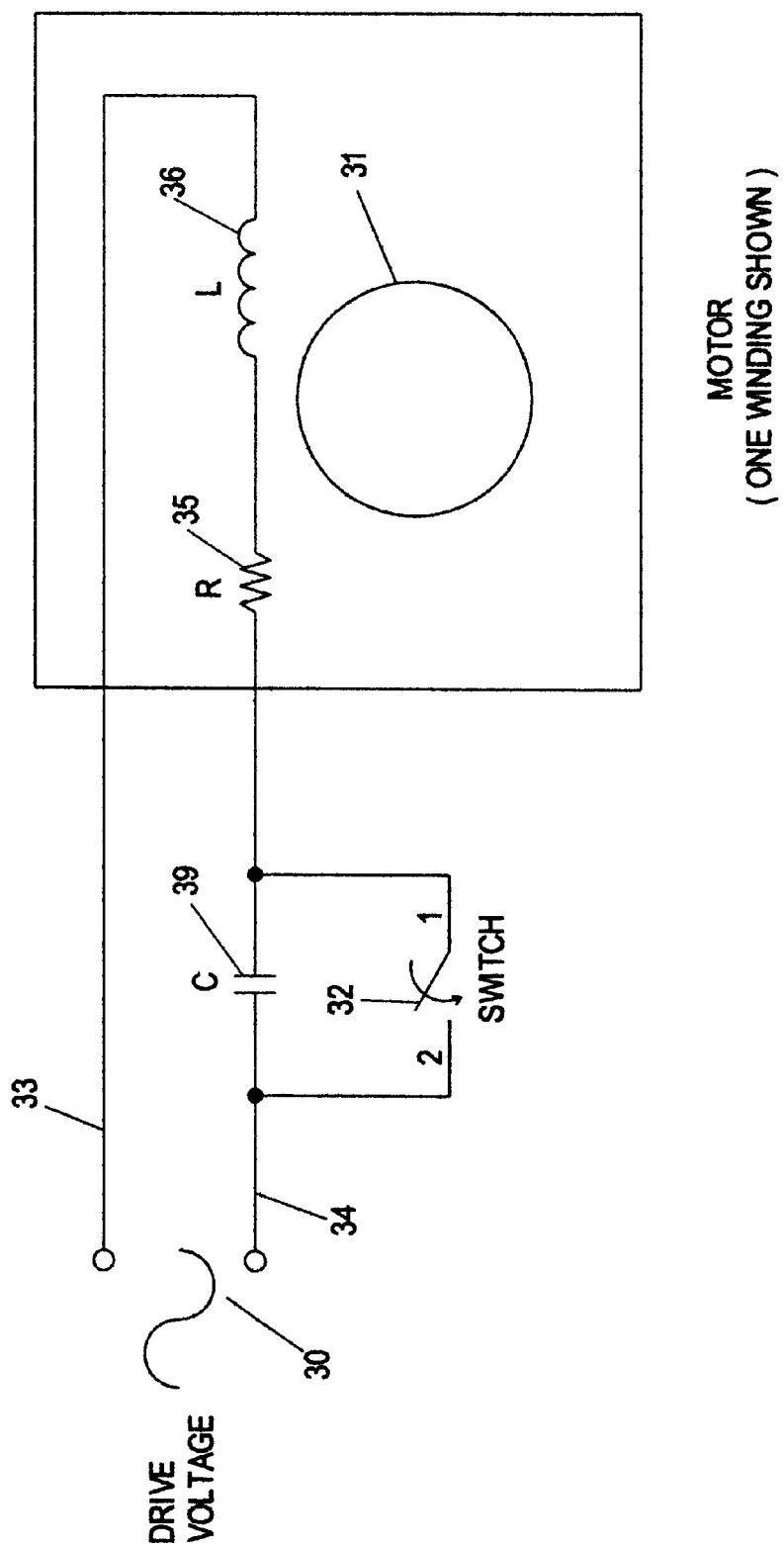
FIG. 4 is a schematic diagram of one embodiment of the present invention.
Figure 5:
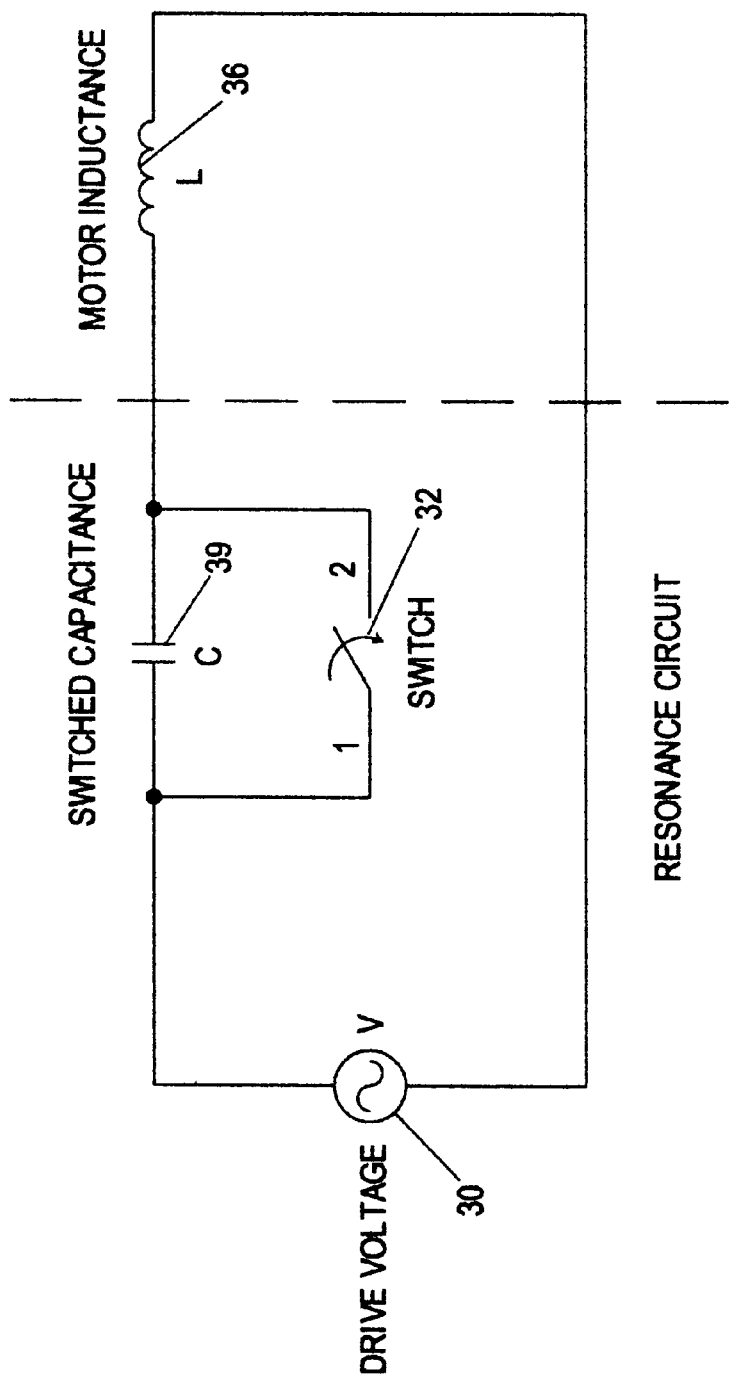
FIG. 5 is a schematic diagram of another embodiment of the present invention.

FIGS. 4 and 5 illustrates simple embodiments of the present invention with a single winding motor 31. Current and voltage are supplied from source 30 on lines 33 & 34, and switch 32 is closed to bypass capacitor 39. Motor 31 has resistance 35 and inductance 36. When the desired frequency is reached, switch 32 is opened bringing capacitor 39 into the circuit.

Figure 6:
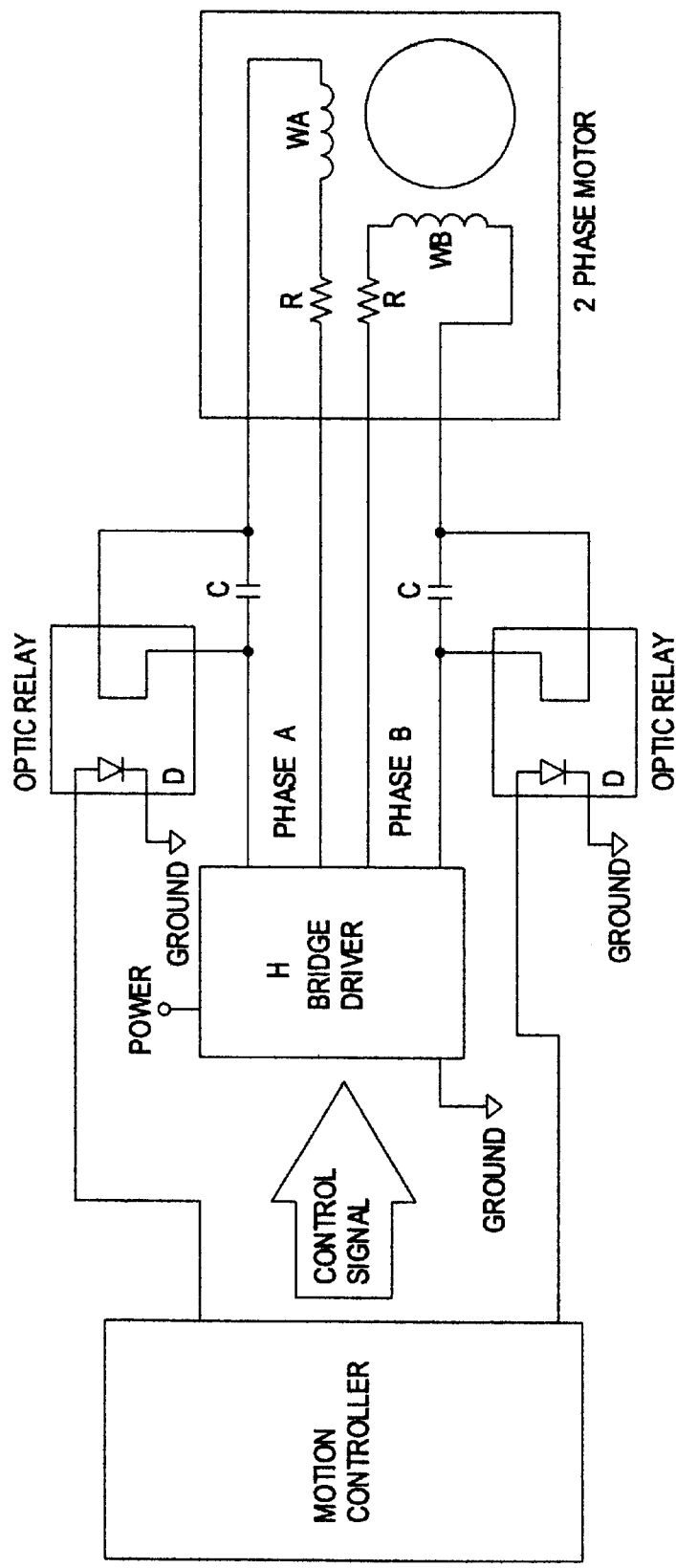
FIG. 6 is a simplified diagram of the control and drive circuit for a 2-phase motor application embodying the present invention.

FIG. 6 is a simplified diagram of the control and drive circuit for a 2-phase motor application. A standard H bridge driver configuration is used in this example. The capacitors are switched in and out of the motor circuit with optic relays, although other suitable switching devices could be used. The motion controller is a microprocessor, DSP or other similar device that controls the H bridge and optic relays.

The design of the present invention will work with synchronous variable speed motors, and is specifically designed for stepper motors. These types of motors are driven differently from asynchronous AC induction motors. They require switching of the DC supply to produce variable speed multiphase sine waves. This design has been implemented on a Bipolar Stepper Motor Drive however it will work just as well on a Unipolar Drive.

The switching of the capacitor(s) into the circuit may be performed using one of many different solid-state switching devices. Mechanical relays may work in some applications however they may be too slow and may cause bouncing of the contacts will disrupt the stepper motor operation and may cause loss of step synchronization. In FIG. 6, the switching of the capacitor is done by an optical relay. The optical relay is in parallel with the capacitor and shorts the capacitor out at low speeds. At higher speed the relay opens and current flows through the capacitor.

Multiple capacitors may be used, one after another, to further extend the motor torque. Each such capacitor is tuned at an increasing resonance frequency. A first large capacitor is switched into the circuit when the first resonance frequency is approached. This frequency increases and peaks at resonance for this capacitor and then begins to diminish as frequency further increases. At a given point the first capacitor is switched out, and a second smaller capacitor is switched into the circuit allowing the frequency to continue to increase to a new higher level that resonates with the second capacitor. The switching in of additional capacitors can be repeated until the back EMF of the motor is so great that no further increase is possible.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A circuit for increasing the frequency of rotation of the rotor of an electric motor without increasing the voltage delivered to said motor comprising a processor for monitoring the phase and frequency of said rotor, a capacitor that is switched into series with said motor by said processor when the frequency of rotation of said rotor is such that reactance from the motor itself has begun to prevent current from reaching the motor such that said capacitor resonates in a reinforcing manner with a higher frequency of said rotor.

2. The circuit of claim 1 wherein the point at which said processor switches said capacitor into said circuit is based on pre-calculated values for the frequency and phase of windings of the motor, and the capacitance of said capacitor is such that it has a resonant frequency value that is greater than the drop-off frequency of said motor and less than the drop-out frequency of said motor.

3. The circuit of claim 2 wherein a second capacitor is provided that is switched into series with said motor by said processor in place of said first capacitor when the frequency of rotation of said rotor is greater than the resonant frequency of said first capacitor and the reactance from the motor itself has again begun to prevent current from reaching the motor such that said second capacitor resonates in a reinforcing manner with a higher frequency of said rotor.

4. The circuit of claim 3 wherein the point at which said processor switches said second capacitor into said circuit is based on pre-calculated values for the frequency and phase of windings of the motor, and the capacitance of said second capacitor is such that it has a resonant frequency value that is greater than resonant frequency of said first capacitor.

5. The circuit of claim 2 wherein a plurality of additional capacitors are provided that are alternatively switched into series with said motor by said processor when the frequency of rotation of said rotor is greater than the resonant frequency of the previous capacitor and the reactance from the motor itself has again begun to prevent current from reaching the motor such that said subsequent capacitor resonates in a reinforcing manner with a higher frequency of said rotor.

6. The circuit of claim 5 wherein the point at which said processor switches each capacitor into said circuit is based on pre-calculated values for the frequency and phase of resonant frequency value that is greater than resonant frequency of the previous capacitor.

7. A method for increasing the rotational speed of an electric motor without increasing the voltage delivered to the motor circuit comprising the steps of:
   a. rotating a rotor in said motor;
   b. accelerating the frequency of rotation of said rotor such that the reactance from the motor itself begins to prevent current from reaching the motor;
   c. switching a capacitor into the circuit with said motor in series, said capacitor having a value such that it resonates with a frequency of said rotor that is higher than the frequency at which said capacitor is switched into said circuit; and
   d. continuing to accelerate the frequency of rotation of said rotor using reinforcement from the resonance of said rotor with said capacitor.

8. The method of claim 7 including the additional steps of
   e. switching a second capacitor into the circuit with said motor in series in place of said first capacitor when the frequency of rotation of said rotor is greater than the resonant frequency of said first capacitor and the reactance from the motor itself has again begun to prevent current from reaching the motor, said second capacitor having a value such that it resonates with a frequency of said rotor that is higher than the frequency at which said second capacitor is switched into said circuit; and
   f. continuing to accelerate the frequency of rotation of said rotor using reinforcement from the resonance of said rotor with said second capacitor.

9. The method of claim 8 wherein steps "e" and "f" are repeated with a plurality of subsequent alternative capacitors.

* * * * *

UNITED STATES PATENT AND TRADEMARK OFFICE
CERTIFICATE OF CORRECTION

PATENT NO.    : 6,566,839 B2
DATED         : May 20, 2003
INVENTOR(S)   : Daniel Robert DaSilva, John Pretzer and Glenn Waehner It is certified that error appears in the above-identified patent and that said Letters Patent is hereby corrected as shown below:

Column 4,
Line 29, insert -- that -- after "so".

Column 5,
Line 1, insert -- the -- after "At".
Line 25, delete "at" after "oscillations".
Lines 34-35, delete "an" and replace it with -- a --.
Line 42, delete "use" and replace it with -- used --.
Line 42, insert -- the capacitor -- after "switch".
Line 46, insert -- it -- after "point,".
Line 46, delete "the" after "than".

Signed and Sealed this

Twenty-third Day of September, 2003

JAMES E. ROGAN
*Director of the United States Patent and Trademark Office*